Oct. 15, 1940.  V. W. KLIESRATH  2,217,956

CLUTCH CONTROL MECHANISM

Original Filed Aug. 28, 1931   2 Sheets-Sheet 1

INVENTOR,
VICTOR W. KLIESRATH
BY
ATTORNEY

Oct. 15, 1940.  V. W. KLIESRATH  2,217,956

CLUTCH CONTROL MECHANISM

Original Filed Aug. 28, 1931  2 Sheets-Sheet 2

INVENTOR.
VICTOR W. KLIESRATH
BY

Patented Oct. 15, 1940

2,217,956

UNITED STATES PATENT OFFICE 2,217,956

CLUTCH CONTROL MECHANISM

Victor W. Kliesrath, South Bend, Ind., assignor to Bragg-Kliesrath Corporation, South Bend, Ind., a corporation of New York Application August 28, 1931, Serial No. 559,990
Renewed January 25, 1937

9 Claims. (Cl. 192—.01)

This invention relates to clutch controls, and is illustrated as embodied in a vehicle such as an automobile arranged to permit of quicker clutch engagement when in high than in low gear, thereby giving a soft and easy engagement of the clutch in low gear without interfering with rapid and smooth engagement in high gear.

While not in all its features necessarily so limited, the invention is especially advantageous in controlling the actuation, and especially the engagement, of a power-actuated clutch, and is illustrated as a vacuum-operated clutch actuated by the suction of the intake manifold, and preferably controlled by the accelerator which also operates the engine throttle.

In the illustrated arrangement, the clutch-controlling valve, or an equivalent device, which in this instance controls the speed of clutch engagement, is arranged to be actuated simultaneously with the shifting of the change-speed gears, and preferably is directly actuated by a part of the change-speed transmission, for example by one of the usual two parallel movable gear-shift rods or their equivalents.

The particular arrangements shown in the drawings both give relatively rapid engagement of the clutch in high speed (direct drive), and relatively slow engagement in low speed and in reverse. One arrangement gives rapid engagement in second speed position, and the other gives slow engagement in this position, sometimes one and sometimes the other being desirable, according to the particular characteristics of different transmissions.

The above and other objects and features of the invention, including various novel combinations of parts and desirable particular constructions, will be apparent from the following description of the illustrative embodiments shown in the accompanying drawings, in which.

Figure 1:
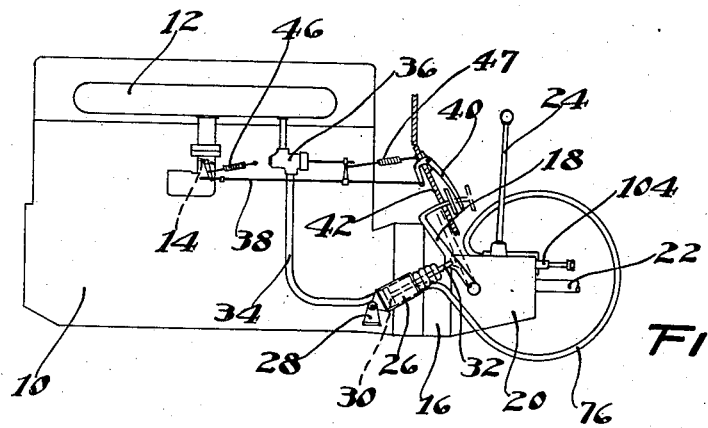
Figure 1 is a side elevation of so much of an automobile as shows the engine, clutch, and change-speed transmission, together with one embodiment of my invention.
Figure 2:
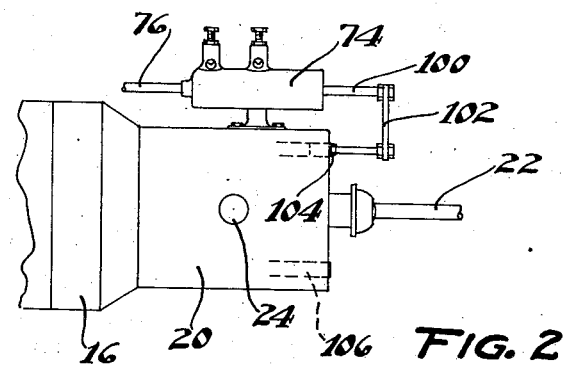
Figure 2 is a top plan view of the transmission of Figure 1, and its associated parts.

In the arrangement of Figures 1–4, the automobile chassis includes the usual engine 10 having an intake manifold 12 controlled by a throttle 14, the usual clutch 16 operable manually if desired by means such as a clutch pedal 18, and the usual change-speed transmission 20 driving the propeller shaft 22 and having a gear-shift lever 24.

The clutch is preferably operated by vacuum power from the suction of the intake manifold 12, there being shown a power cylinder 26 pivoted on a bracket 28 carried by the chassis frame, and containing a piston 30 having a piston rod 32 extending through a closure forming the top of cylinder 26 and which is pivotally connected to the clutch pedal 18. The cylinder 26 is connected alternatively to the manifold 12 or to the atmosphere, through a conduit 34 controlled by a valve 36 shown in detail in Figure 4.

Valve 36 is operatively connected to a rod 38 connected to the accelerator pedal 40 pivoted on the floorboard 42, and which rod also has a lost-motion connection with the throttle 14. The lost motion connection insures the operation of the valve either before the throttle is opened or after the same is closed. With the parts as shown, when the accelerator pedal is released, a return spring 46 closes the throttle to idling position and a return spring 47 opens the valve 36 to establish communication between the manifold 12 and the cylinder 26, thereby causing piston 30 to disengage the clutch. When the accelerator pedal is depressed, the throttle is opened and cylinder 26 is connected to atmosphere, thereby permitting the usual clutch spring to cause the clutch to engage as rapidly as air can escape from the space between piston 30 and the closure at the top of cylinder 26.

The valve 36 includes a casing 50 having an inlet 52 communicating with the intake manifold, and having an outlet 54 communicating through conduit 34 with the cylinder 26. The casing also has openings 56 communicating with the atmosphere and protected by a cup-shaped baffle 58 held by a nut 60 formed with a passage for the operating connection 62.

Figure 4:
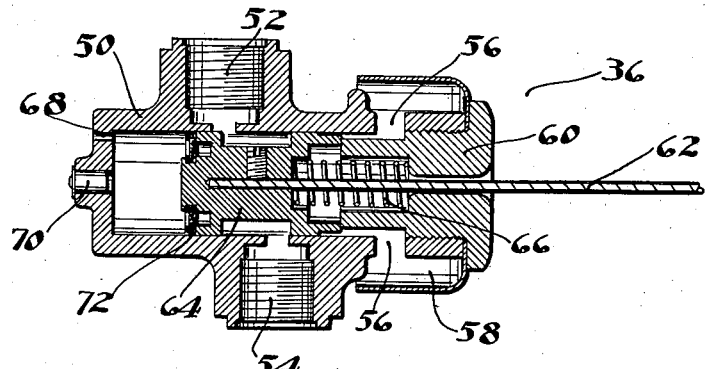
Figure 4 is a section through the accelerator-controlled clutch-controlling valve of Figure 1.

The connection 62 operates a valve piston 64, against the resistance of a return spring 66, to connect the outlet 54 with the inlet 52 when in its right-hand position as shown in Figure 4, this being the position with the accelerator released and the throttle closed and the clutch disengaged, spring 47 being sufficiently stronger than spring 66 to cause such action.

When the accelerator 40 is depressed, spring 66 shifts the valve piston to the left to connect the outlet 54 to the openings 56, thereby permitting the clutch spring to cause the clutch to engage. The valve casing has an opening 68 to permit escape of the air ahead of the valve piston during this movement.

In order to make opening 68 small enough to have a dashpot action, slowing up the valve movement during engagement of the clutch, without restricting its movement in the opposite direction to disengage the clutch, the casing may also be provided with an inwardly-opening check valve 70. The valve piston may also be provided with a friction disk 72 which also serves to graduate and control its movement in a direction to cause clutch engagement.

According to an important feature of the present invention, the actuation of the clutch is controlled, in this particular instance the control being for the purpose of insuring smoothness of engagement, by means controlled by and preferably mounted on the transmission 20 or its equivalent. I prefer to use for this purpose a novel valve 74 shown in detail in Figure 3, and which is connected by means such as a conduit 76 with the top of cylinder 26, to control the escape of the air trapped between piston 30 and the closure at the top of the cylinder 26, and thereby control the dashpot action of the cylinder in graduating the engagement of the clutch.

Figure 3:
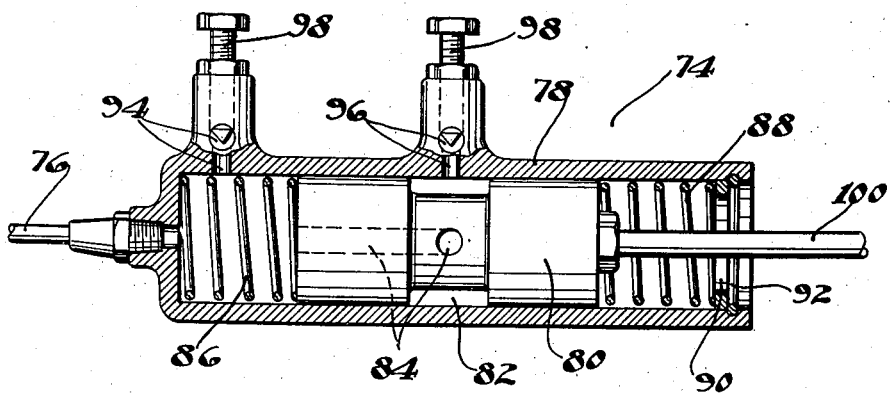
Figure 3 is a section through the transmission-mounted clutch-controlling valve of Figures 1 and 2.

The particular valve shown in Figure 3 includes a casing 78, open at its rear end, in which is arranged a valve piston 80 having an annular space 82 communicating by passages 84 with the space ahead of the valve piston. A spring 86 is arranged between the valve piston 80 and the head of the casing 78, and a balancing spring 88 is confined between the valve piston and a washer 90 held by a snap-ring 92 in the open end of the casing. The valve piston is normally in the central or "neutral" position shown.

The valve casing has two air inlets 94 and 96, adjustably controlled by needle valves 98 if desired, the inlet 94 being continuously in communication with conduit 76 and the inlet 96 being in communication therewith only in the central or "neutral" position shown and being cut off therefrom by shifting the valve piston in either direction.

The valve piston 80 is connected, by means such as a rod 100 and a rigid crosshead 102, to one of the usual two parallel movable and lengthwise-slidable gear-shift rods or equivalent members 104 and 106, controlled as usual by a driver-operated member such as the gear-shift lever 24.

In the usual arrangement of the parts, gear-shift lever 24 moves member 104 forward for low gear and rearward for reverse, member 106 being in neutral; or it moves member 106 rearward for second speed and forward for high (direct drive), member 104 being in neutral. All passenger cars and most trucks today use this shift.

In the illustrated arrangement, the valve piston 80 is connected to the shift member 104, so that when this member is in neutral (i. e., while member 106 is being used, with the gears either in second or in high) both inlets 94 and 96 are in communication with conduit 76, permitting relatively rapid clutch engagement, or at least engagement which is not as slow as when inlet 96 is cut off. If however the gear-shift lever 24 is manipulated to shift into either low or reverse, by moving shift member 104 one way or the other from neutral, inlet 96 is cut off and the clutch engagement is slowed up correspondingly to give the slower action desirable at the low speeds.

Figure 5:
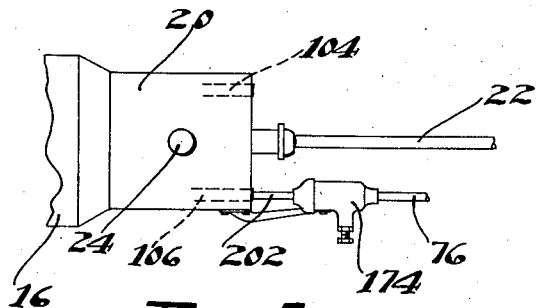
Figure 5 is a plan view of a transmission, corresponding to Figure 2, but showing a different valve which is also mounted somewhat differently.
Figure 6:
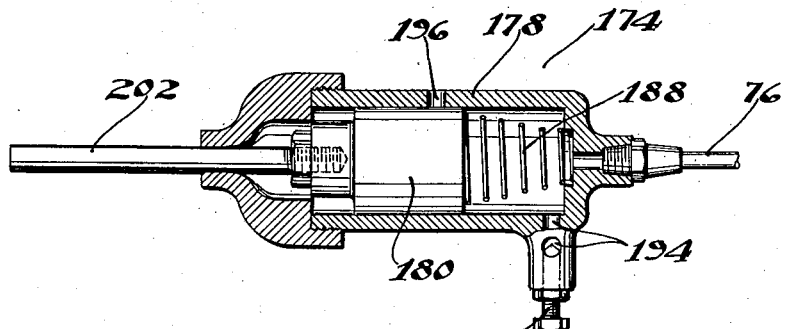
Figure 6 is a section through the valve of Figure 5.

In the arrangement of Figures 5 and 6, the clutch engagement is also slowed up in second speed, this being desirable for use with transmissions having a relatively low second speed.

In this arrangement, the valve 174 is connected for operation by the shift member 106. The illustrated valve includes a casing 178 having one inlet 194 shown as controlled by a needle valve 198 and which is continuously in communication with the conduit 76.

The casing also has another inlet 196, shown by way of illustration as of fixed size, controlled by a valve piston 180 backed up by a spring 188 and connected by means such as a suitable thrust rod 202 to the shift member 106. Rod 202 may if desired be held by spring 188 in disconnected thrust engagement with the end of the shift member 106, so that the device may readily be applied to a transmission not originally built for it, as in equipping old cars in the field.

It will be seen that inlet 196 is only in communication with the conduit 76 when the car is in high gear (direct drive), at all other times being cut off by the valve piston 180.

While two illustrative embodiments have been described in detail, it is not my invention to limit its scope to those particular embodiments, or otherwise than by the terms of the appended claims.

I claim:

1. A vehicle having a clutch, a transmission provided with a pair of parallel movable gear-shift members, and means controlling the action of said clutch and actuated by one of the gear-shift members, said means having a central "neutral" position for controlling the clutch in one manner when the other gear-shift member is being operated and having at least one extreme position to which it is shifted by the first gear-shift member and in which it controls the clutch in a different manner.

2. A vehicle having a clutch, a transmission provided with a pair of parallel movable gear-shift members, and means controlling the action of said clutch and actuated by one of the gear-shift members, said means having a central "neutral" position for controlling the clutch in one manner when the other gear-shift member is being operated and having two extreme positions to one or the other of which it is shifted by the first gear-shift member and in either of which it controls the clutch in a different manner.

3. A vehicle having an engine with an intake manifold provided with a throttle, a clutch having a vacuum operator and provided with a valve alternatively connecting the operator to the manifold or to atmosphere, an accelerator operating both the throttle and said valve, a valve acting on the vacuum operator and controlling its reverse movement to control the speed of engagement of the clutch and which has a plurality of positions modifying said speed of engagement, a change-speed transmission, and means for actuating said transmission and simultaneously shifting said last-named valve from one position to another.

4. A vehicle having an engine with an intake manifold provided with a throttle, a clutch having a vacuum operator and provided with a valve alternatively connecting the operator to the manifold or to atmosphere, an accelerator operating both the throttle and said valve, a valve acting on the vacuum operator and controlling its reverse movement to control the speed of engagement of the clutch and which has a plurality of positions modifying said speed of engagement, and a change-speed transmission arranged to shift said last-named valve from one position to another.

5. A vehicle having a clutch, a transmission provided with a pair of parallel movable gear shift members, means for controlling the action of said clutch, and means interconnecting said last-mentioned means with one of said pair of movable gear shift members, said clutch controlling means having a neutral position for controlling the clutch in one manner when one of the gear shift members is being operated and having at least one extreme position to which it is shifted by its connected gear shift member to control the operation of the clutch in a different manner.

6. Apparatus of the character described comprising a power device connected to an operating member of a motor vehicle clutch, a control device operable for rendering said power device operative to move the clutch to inoperative position, and means connected to the gear set of the vehicle and controlling the power device for determining the rate of movement of the clutch elements into engagement with each other in accordance with the position of the gears in the gear set.

7. Apparatus of the character described comprising a fluid pressure power device connected to an operating member of a motor vehicle clutch, a control device operable for establishing a pressure differential in said power device for rendering it operative to move the clutch to inoperative position, and means connected to the gear set of the vehicle for determining the rate of reestablishment of pressure equalization in the power device to control the rate of movement of the clutch elements into engagement with each other in accordance with the position of the gears in the gear set.

8. Apparatus of the character described comprising a differential pressure power device having a movable member connected to a motor vehicle clutch, an operating valve normally operative for establishing pressure equalization in the power device and operable for establishing differential pressure therein, and control valve mechanism connected to the gear set of the vehicle for determining the rate of pressure equalization in the power device to control the rate of movement of the clutch elements into engagement with each other in accordance with the position of the gears in the gear set.

9. Apparatus of the character described comprising a fluid pressure power device connected to an operating member of a motor vehicle cultch, a device operable for establishing a pressure differential in said power device for rendering it operative to move the clutch to inoperative position, normally operative means for determining the rate of reestablishment of pressure equalization in the power device to determine the rate of the return movement of the clutch elements into engagement with each other, a control member engageable with the low and reverse gear shift rod of the gear set and adapted to be actuated thereby upon movement of the gears to low or reverse position and means operative upon actuation of said member for reducing the normal rate of reestablishment of pressure equalization in the power device.

VICTOR W. KLIESRATH.